United States Patent
Mori et al.

(10) Patent No.: US 11,752,925 B2
(45) Date of Patent: Sep. 12, 2023

(54) LAMP DEVICE

(71) Applicants: STANLEY ELECTRIC CO., LTD., Tokyo (JP); HONDA MOTOR CO., LTD., Tokyo (JP)

(72) Inventors: Kentaro Mori, Tokyo (JP); Hironori Tamakawa, Tokyo (JP); Hideaki Aizawa, Tokyo (JP); Takato Watanabe, Tokyo (JP); Miho Sasaki, Saitama (JP); Masayuki Takayama, Saitama (JP)

(73) Assignees: STANLEY ELECTRIC CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/724,482

(22) Filed: Apr. 19, 2022

(65) Prior Publication Data

US 2022/0340072 A1  Oct. 27, 2022

(30) Foreign Application Priority Data

Apr. 23, 2021  (JP) .................................. 2021-073139

(51) Int. Cl.
*B60Q 1/00*  (2006.01)
*G01S 7/02*  (2006.01)
*G01S 13/931*  (2020.01)

(52) U.S. Cl.
CPC ............ *B60Q 1/0023* (2013.01); *G01S 7/027* (2021.05); *G01S 13/931* (2013.01); *G01S 2013/93271* (2020.01); *G01S 2013/93277* (2020.01)

(58) Field of Classification Search
CPC ...... B60Q 1/0023; G01S 7/027; G01S 13/931
See application file for complete search history.

(56) References Cited

U.S. PATENT DOCUMENTS

| | | | |
|---|---|---|---|
| 11,467,284 B2* | 10/2022 | Yamamoto | B60Q 1/0023 |
| 2005/0275521 A1 | 12/2005 | Li | |
| 2020/0101889 A1 | 4/2020 | Iwai et al. | |
| 2021/0061388 A1 | 3/2021 | Maeda et al. | |
| 2021/0231284 A1* | 7/2021 | Mano | F21S 41/55 |
| 2021/0245652 A1* | 8/2021 | Kamal | B60Q 1/2607 |
| 2021/0292239 A1* | 9/2021 | Kiyota | B60Q 1/0023 |
| 2022/0176865 A1* | 6/2022 | Mazzarelli | B60P 7/083 |
| 2022/0268923 A1* | 8/2022 | Katsurada | B60Q 1/0023 |

FOREIGN PATENT DOCUMENTS

| | | |
|---|---|---|
| CN | 212685403 U | 3/2021 |
| EP | 3 766 743 A1 | 1/2021 |
| JP | 2010-137758 A | 6/2010 |
| JP | 5130192 B2 | 1/2013 |
| JP | 2020-051974 A | 4/2020 |

OTHER PUBLICATIONS

Extended European Search Report for the related European Patent Application No. 22168976.3 dated Sep. 5, 2022.

* cited by examiner

*Primary Examiner* — Christopher E Dunay
(74) *Attorney, Agent, or Firm* — Kenealy Vaidya LLP

(57) ABSTRACT

A lamp device has a base body to be installed to a vehicle; a lamp unit; a translucent cover that is installed to the base body, covering the front surface of the base body so as to accommodate the lamp unit therein, thereby defining a lamp body space, and has a recess in the front surface at a side position in a horizontal direction of the lamp unit; and a radar unit that has a radar sensor and a radar housing accommodating the radar sensor therein, and is inserted in the recess.

10 Claims, 2 Drawing Sheets

LAMP DEVICE

This application claims priority under 35 U.S.C. § 119 to Japanese Patent Application No. 2021-073139 filed on Apr. 23, 2021. The entire contents of this earlier application is incorporated herein by reference.

BACKGROUND OF THE INVENTION

1. Field of the Invention

The present invention relates to a lamp device and, more particularly, to a vehicular lamp device provided with a built-in radar device.

2. Description of the Related Art

For driver assistance and automatic driving, various sensors such as cameras, LiDAR (Light Detection and Ranging), and millimeter wave sensors are used in addition to acceleration sensors and GPS sensors.

Millimeter wave radars, in particular, are not affected by environmental factors such as nighttime and backlight, and bad weathers such as dense fog, rainfall and snowfall, thus maintaining performance that is highly resistant to environmental influence. In addition, millimeter wave radars can directly detect the distance to and direction of an object, and the relative speed with respect to the object. Therefore, millimeter wave radars are characterized by being capable of detecting even a short-distance object at high speed and with high accuracy.

Japanese Patent No. 5130192 discloses a vehicular lighting fixture that is provided with a light source unit and a millimeter wave radar, has a plastic cover that appears on the exterior of a vehicle body, and has an opaque design section on a part of the plastic cover, the millimeter wave radar being shielded by the design section.

Further, Japanese Unexamined Patent Application Publication No. 2020-51974 discloses an in-vehicle light device with a separator that is arranged to partition a space between a lighting fixture unit and a radar unit and shield the transmission of radiant heat and electromagnetic waves between the lighting fixture unit and the radar unit.

However, the detection function of a radar device is degraded under the influence of a high temperature environment outside a lamp body caused by the heat generated by a lamp inside the lamp body and engine heat, or the like. In particular, a radar device adapted to detect the lateral direction of a vehicle is easily affected by the radiant heat of the vehicle itself, such as engine heat.

Further, it is important to reduce not only the heat generated by the lamp, but also the influence of the radiant heat from an engine and the like when the lamp is off.

SUMMARY OF THE INVENTION

The present invention has been made in view of the problems described above, and an object of the invention is to provide a lamp device that can effectively suppress the influence of not only the heat generated by a lamp but also of the radiant heat of a vehicle itself such as engine heat and the like, and has a highly accurate radar function.

A lamp device according to an embodiment of the present invention has:

a base body to be installed to a vehicle;

a lamp unit;

a translucent cover that is installed to the base body, covering a front surface of the base body so as to accommodate the lamp unit therein, thereby defining a lamp body space, and has a recess in a front surface at a side position in a horizontal direction of the lamp unit; and a radar unit that has a radar sensor and a radar housing accommodating the radar sensor therein, and is inserted in the recess.

DESCRIPTION OF THE PREFERRED EMBODIMENTS

Figure 1:
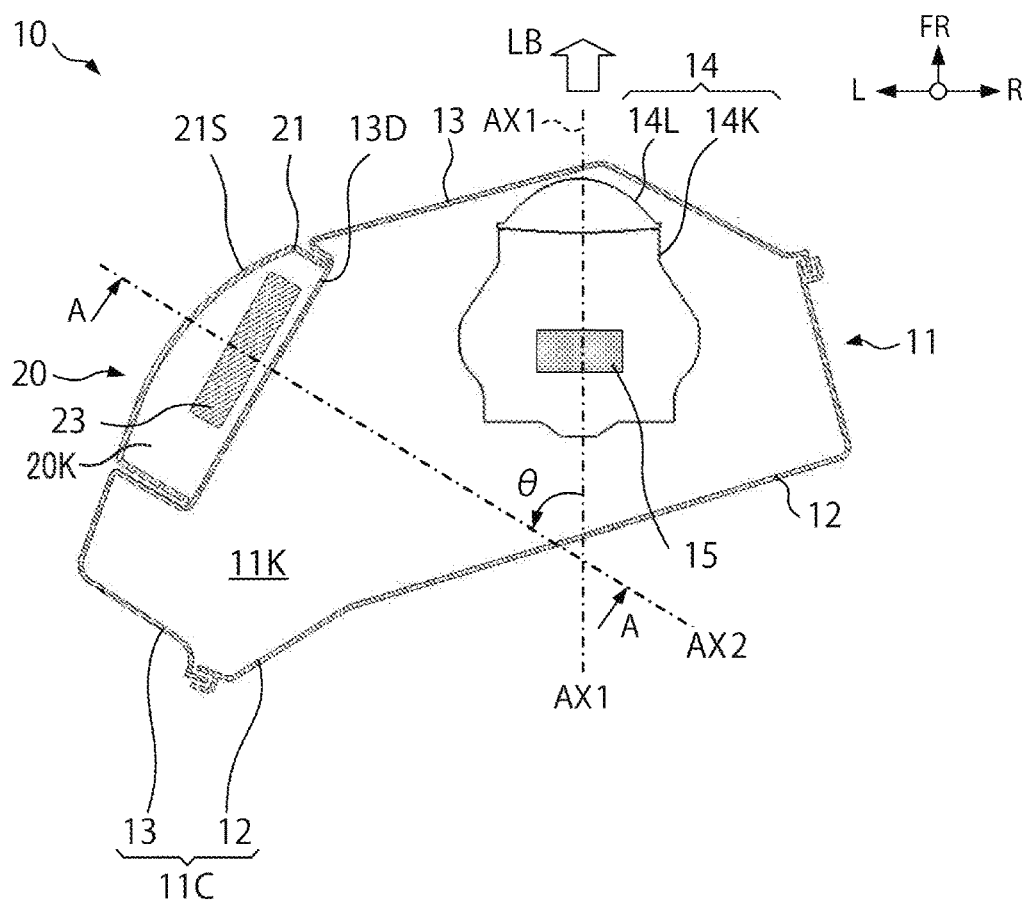
FIG. 1 is a diagram schematically illustrating an example of the internal structure of a lamp device 10 according to a first embodiment of the present invention.

The following will describe preferred embodiments of the present invention, but the embodiments may be modified or combined, as necessary, for applications. Further, in the following description and the accompanying drawings, substantially the same or equivalent parts will be assigned the same reference numerals and described.

In the following description, although an automobile will be described as an example of a vehicle, the present invention is not limited thereto. In other words, in the present specification, a vehicle means, for example, a ship, an aircraft, or any other type of vehicle, and a manned or unmanned means of transportation.

First Embodiment

FIG. 1 is a diagram schematically illustrating an example of the internal structure of a lamp device 10 according to a first embodiment of the present invention. The lamp device 10 is mounted on a vehicle such as an automobile. The lamp device 10 is, for example, a headlight, but can also be applied to a lamp device such as a taillight.

More specifically, FIG. 1 schematically illustrates a section of the lamp device 10 (left headlight), which has been mounted on the front left of a vehicle, as viewed from above, i.e., in a horizontal plane (or a plane parallel to a road surface).

In the present specification, the terms horizontal and vertical planes (or directions) refer to horizontal and vertical planes (or directions) when the lamp device 10 is installed to the vehicle, and correspond to the horizontal and vertical planes (or directions) of the vehicle.

The lamp device 10 has a lamp 11 and a radar unit 20, which is a radar. In the lamp device 10, a base body (housing) 12 and a translucent cover (front cover) 13 attached to the front surface side or front side of the base body 12 constitute a lamp chassis (casing) 11C.

More specifically, a lamp body space 11K, which is an internal space, is defined by attaching the translucent cover 13 to the base body 12. In the present embodiment, the lamp body space 11K is configured as a sealed space.

The translucent cover 13 is attached to the base body 12 so as to cover the front surface side of the base body 12, and the base body 12 is installed to a vehicle body, thereby mounting the lamp device 10 on the vehicle body (not illustrated).

The base body 12 is formed of plastic (resin). For example, headlights are formed of polypropylene (PP), and taillights are formed of acrylonitrile styrene acrylic rubber (ASA), but the present invention is not limited thereto. Further, metal or the like may be used for some portions.

Further, the translucent cover 13 is formed of a translucent resin such as polycarbonate (PC). The translucent cover 13 may have translucency that transmits light other than white, such as red or yellow.

A lamp unit (or light source unit) 14 is provided in the lamp body space 11K of the lamp chassis 11C. The lamp unit 14 has a light source 15 such as a light emitting diode (LED), and an optical system 14L such as a lens or a reflector for distributing or irradiating the light from the light source 15 along an optical axis AX1. The light source 15 is provided in a light source chassis 14K.

The lamp unit 14 is provided in such a manner as to apply light beam LB of low beam (passing beam) and high beam (driving beam) in a forward direction (FR in the figure).

Further, an extension or the like may be provided in the lamp chassis 11C. The extension is a design component provided to reflect or guide light, or make it difficult to see an internal structure or the like from the outside.

In the present specification, the lamp device 10 refers to any light emitting device having a purpose or a function of emitting light toward the outside, such as a taillight and a backlight, rather than being limited to a headlight light source.

The translucent cover 13 is provided with a cover recess (hereinafter referred to simply as the recess) 13D. The recess 13D is provided in such a manner as to be located in the front surface of the translucent cover 13 and on a side of the lamp unit 14 in a horizontal or lateral direction.

Further, the radar unit 20 is provided in the recess 13D by being inserted thereto. The radar unit 20 has a radar housing 21, and is separated from the lamp body space 11K of the lamp chassis 11C by the translucent cover 13 to define a separated space (i.e. radar unit space) 20K.

The radar unit 20 has the radar housing 21 and a radar sensor 23, which is a range detecting sensor provided in the radar housing 21. The radar unit 20 is, for example, a millimeter wave radar device.

Further, the physical strength of the translucent cover 13 can be enhanced by providing the translucent cover 13 with the recess 13D. More specifically, when the radar unit 20, which has a predetermined weight, is installed on the translucent cover 13, the side surfaces of at least two or more surfaces of the recess 13D that surround the radar unit 20 can suppress the distortion of the translucent cover 13. This makes it possible to suppress a change in distribution of light emitted from the lamp unit 14, the change being attributable to the distortion of the translucent cover 13.

The surface of the radar housing 21 is shaped in such a manner as to be integral with the surface of the translucent cover 13 (the surface other than the recess 13D) of the lamp device 10.

The radar sensor 23 has a transmitting/receiving antenna (not illustrated), and a central axis AX2 of a radar wave by the transmitting/receiving antenna is set such that the central axis AX2 is tilted by an angle θ (θ>0) in an outward direction (i.e., to the left in the case of a left headlight) with respect to the optical axis AX1 of the lamp unit 14 (or with respect to a traveling direction FR of the vehicle).

Figure 2:
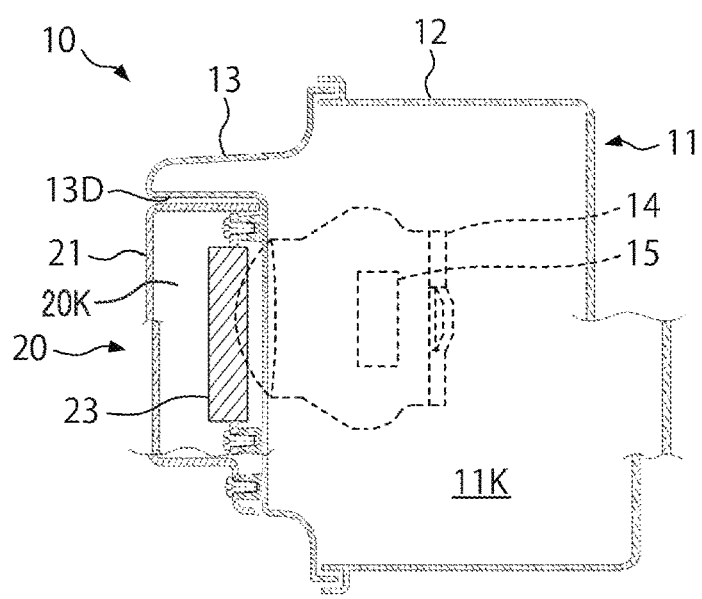
FIG. 2 is a sectional view schematically illustrating an example of the internal structure of the lamp device 10.

FIG. 2 is a sectional view schematically illustrating an example of the internal structure of the lamp device 10. The figure illustrates a section in a vertical plane including the central axis AX2 of the transmitting/receiving antenna (the direction indicated by A in FIG. 1).

As illustrated in FIG. 1 and FIG. 2, the radar sensor 23 is placed to be positioned on a side outside the lamp unit 14 in a horizontal plane (i.e., on a side in the horizontal direction). FIG. 2 illustrates the lamp unit 14 (indicated by the dashed line) placed behind the radar sensor 23.

Figure 3:
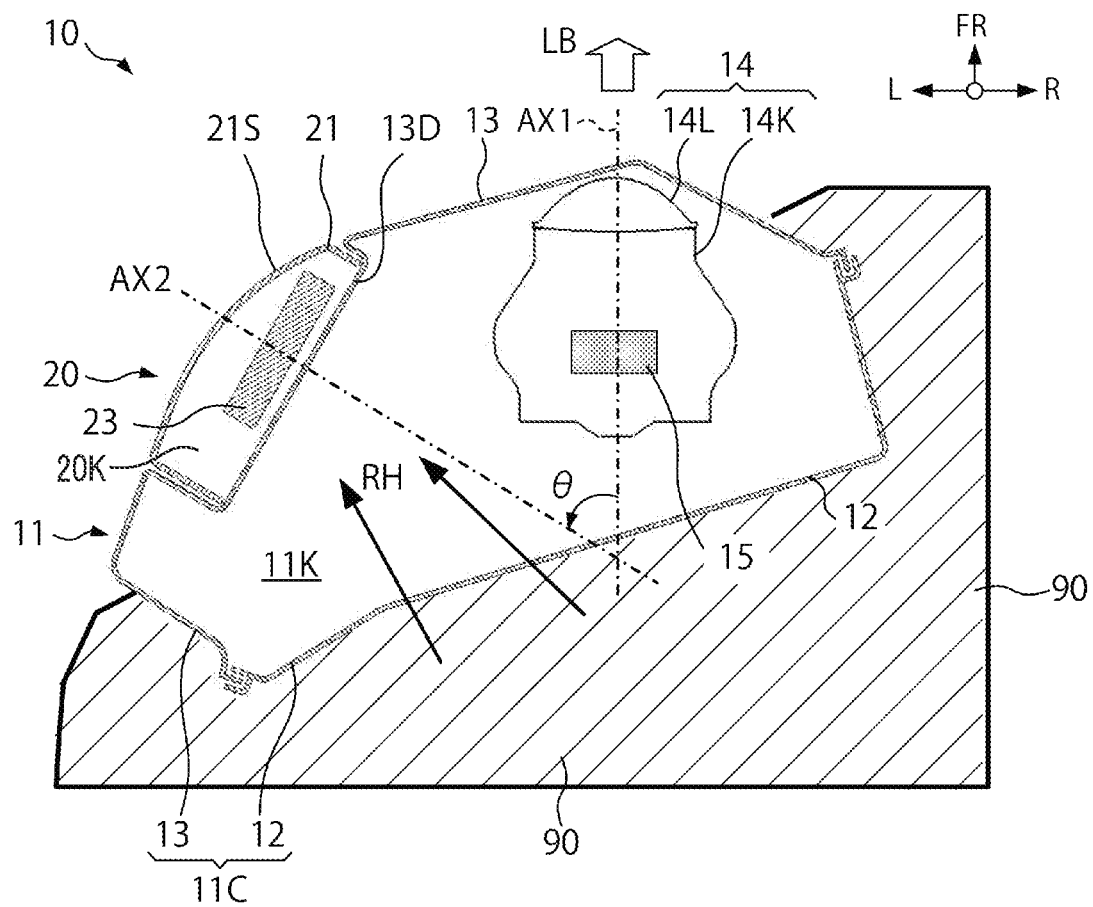
FIG. 3 is a sectional view illustrating radiant heat RH from a heat source 90 of a vehicle provided with the lamp device 10.

FIG. 3, which is similar to FIG. 1, illustrates radiant heat RH from the heat source 90 such as an engine of a vehicle with the lamp device 10 mounted therein. According to the lamp device 10 of the present embodiment, the lamp device 10 has the lamp body space 11K subjected to the radiant heat from the heat source 90 such as an engine.

The radar unit 20 is separated by the lamp body space 11K of the lamp 11, thus avoiding the influence of the radiant heat RH from the heat source 90 of the vehicle itself, which is a high temperature environment. Consequently, a rise in temperature of the radar unit 20 can be reduced.

Thus, it is possible to provide a lamp device which has a highly accurate radar function with suppressed influence of heat.

Second Embodiment

Figure 4:
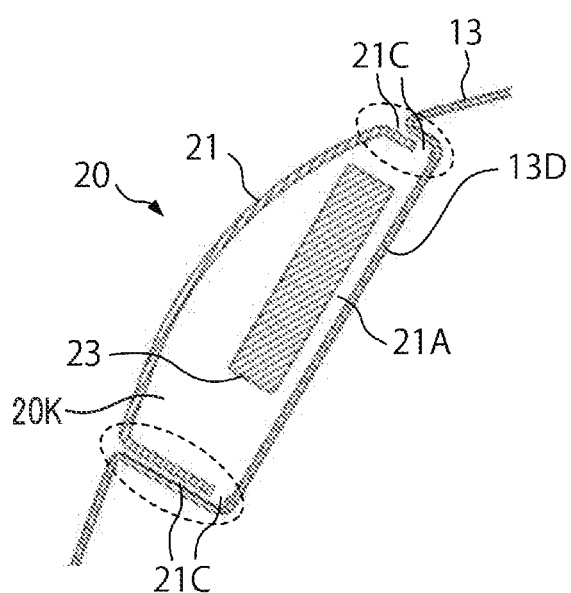
FIG. 4 is a sectional view schematically illustrating the structure of a lamp device 10 according to a second embodiment of the present invention.

FIG. 4 is a partially enlarged sectional view schematically illustrating the structure of a lamp device 10 according to a second embodiment of the present invention. More specifically, FIG. 4 is an enlarged view of the structure of a radar unit 20.

A radar housing 21 of the radar unit 20 has a communication portion 21C, through which the outside and the interior of the radar housing 21 communicate, between the radar housing 21 and a recess 13D of a translucent cover 13 of a lamp 11. In other words, the radar unit 20 is not sealed, and the interior thereof is an unsealed space.

Further, a radar sensor 23 is installed to the translucent cover 13 such that a gap is provided between itself and the side surface of the recess 13D of the translucent cover 13 (refer to FIG. 2).

With the configuration described above, in the radar sensor 23, an air flow path 21A is formed between the back surface of the radar sensor 23 and the translucent cover 13 to perform heat dissipation and cooling of the radar sensor 23, thereby making it possible to reduce the influence of the heat from the lamp 11.

The communication portion 21C preferably opens at the bottom of the recess 13D of the translucent cover 13. Further, as illustrated in FIG. 4, the communication portion 21C is preferably provided at each of both left and right (in the horizontal direction) ends. This provides high cooling effect by the flow of air through the flow path 21A at the back of the radar sensor 23, so that the influence of the radiant heat RH from the heat source 90 can be effectively reduced.

Therefore, the radar sensor 23 is separated by the lamp body space 11K of the lamp 11, has high cooling effect, and reduces the influence of the radiant heat RH from the heat source 90 of a vehicle, which is a high-temperature environment, thus making it possible to prevent a rise in temperature of the radar unit 20.

Description of Reference Numerals

10: lamp device
11: lamp
11C: lamp chassis

11K: lamp body space
12: base body
13: translucent cover
13D: recess
14: lamp unit
14K: light source chassis
14L: optical system
15: light source
20: radar unit
20K: radar unit space
21: radar housing
21A: air flow path
21C: communication portion
23: radar sensor
90: heat source

What is claimed is:

1. A lamp device comprising:
a base body to be installed to a vehicle;
a lamp unit;
a translucent cover that is installed to the base body, covering a front surface of the base body so as to accommodate the lamp unit therein, thereby defining a lamp body space,
a radar unit that has a radar sensor and a radar housing; and
a recess concavely formed on a front surface of the translucent cover, wherein
the radar unit is provided inside the recess thereby defining a radar unit space, which is separated from the lamp body space by the translucent cover, and
the recess is provided at the side position of the lamp unit in a horizontal direction.

2. The lamp device according to claim 1, wherein the radar housing has a communication portion that allows communication between an interior of the radar unit and the outside.

3. The lamp device according to claim 2, wherein the recess of the translucent cover is placed such that at least two surfaces of the recess surround the radar unit.

4. The lamp device according to claim 2, wherein the communication portion of the radar housing opens at a bottom of the recess.

5. The lamp device according to claim 4, wherein the communication portion is provided at each of both left and right ends of the radar housing.

6. The lamp device according to claim 1, wherein the recess of the translucent cover is placed such that at least two surfaces of the recess surround the radar unit.

7. The lamp device according to claim 1, wherein the base body is mounted in a position so as to be subjected to radiant heat from a heat source of the vehicle; and
the radar unit and the heat source are separated by the lamp body space.

8. The lamp device according to claim 7, wherein the heat source of the vehicle is an engine.

9. The lamp device according to claim 1, wherein a surface of the radar housing is shaped so as to be integral with a surface of the translucent cover other than the recess.

10. The lamp device according to claim 1, wherein the radar sensor has a transmitting/receiving antenna, and a central axis of a radar wave, generated by the transmitting/receiving antenna, is tilted with respect to an optical axis of the lamp unit.

* * * * *